United States Patent [19]

Ziegler

[11] 4,049,246
[45] Sept. 20, 1977

[54] BUMPER GUARD FOR STEEL CONVERTING APPARATUS ENCLOSURE

[75] Inventor: Joseph Ziegler, Apollo, Pa.

[73] Assignee: Pennsylvania Engineering Corporation, Pittsburgh, Pa.

[21] Appl. No.: 664,533

[22] Filed: Mar. 8, 1976

[51] Int. Cl.² ............................................. C21C 5/28
[52] U.S. Cl. ................................. 266/158; 266/142; 266/287; 98/115 R
[58] Field of Search ..................... 98/115 R, 115 VM; 266/142, 158, 287

[56] References Cited

U.S. PATENT DOCUMENTS 3,918,691 11/1975 Overmyer ........................ 266/158 X Primary Examiner—Roy Lake
Assistant Examiner—Paul A. Bell
Attorney, Agent, or Firm—Fred Wiviott

[57] ABSTRACT

An open topped vessel for converting molten ferrous metal to steel is pivotal about a horizontal axis and has bottom tuyeres for blowing oxygen or other gases upwardly through molten metal contained therein. An enclosure at least partially surrounds the vessel and cooperates with a smoke hood to prevent the escape of pollutants when the vessel is in a generally vertical gas blowing position. The vessel is pivotable about a horizontal axis to position its open top adjacent an access door in the enclosure whereby the vessel may be charged with hot metal from a ladle or with scrap from a charging chute. A pair of bumpers are positioned adjacent the access door support beams to prevent damage thereto by the charging apparatus.

11 Claims, 7 Drawing Figures

BUMPER GUARD FOR STEEL CONVERTING APPARATUS ENCLOSURE

BACKGROUND OF THE INVENTION

This invention relates to enclosures for steel conversion apparatus.

In the pneumatic type of steel conversion apparatus generally includes an open topped vessel having a gas delivery system for providing oxygen to quantity of molten ferrous metal. For example, pneumatic converters of the Q-BOP type have tuyeres extending through its lower end for injecting oxygen beneath the level of molten metal within the vessel. In addition, a hydrocarbon shielding fluid such as natural gas, propane or light oil, is injected in surrounding relation to the oxygen for prolonging tuyere life. As a result of the reactions within the vessel and the disassociation of the shielding fluid, pollutant gases and particulate material are discharged from the open upper end of the vessel. In order to prevent the release of pollutants into the atmoshere, such vessels are often provided with a smoke hood coupled to a gas cleaning system. Such smoke hoods are normally disposed above the open upper end of the vessel and are incapable of completely collecting off-gases when the vessel is tilted for receiving hot metal or scrap. Accordingly, an enclosure may be provided around the vessel for preventing discharge of pollutants during such charging operations. An access door is provided on the side of the housing toward which the vessel is tilted to that hot metal ladles and scrap charging chutes may be moved into the access opening for charging the vessel. Charging ladles are normally moved into position for charging hot metal into the vessel by means of an overhead crane from which it is supported by hooks and cables. A ladle full of molten metal has substantial inertia as it is moved toward the access opening and its support hooks or cables sometimes impacts the access door support frame causing sufficient damage to prevent the closure of the access doors.

SUMMARY OF THE INVENTION

A general object of the invention is to provide an enclosure for steel converting apparatus with means for protecting the access door support assembly from damage by metal charging apparatus.

A more specific object of the invention is to provide protective means for converter vessel enclosures having means for absorbing the impact energy of hot metal ladle support hooks and cables which may engage the enclosure access opening during a charging operation.

These and other objects and advantages of the present invention will become more apparent from the detailed description thereof taken with the accompanying drawings.

DESCRIPTION OF THE PREFERRED EMBODIMENT

Figure 1:
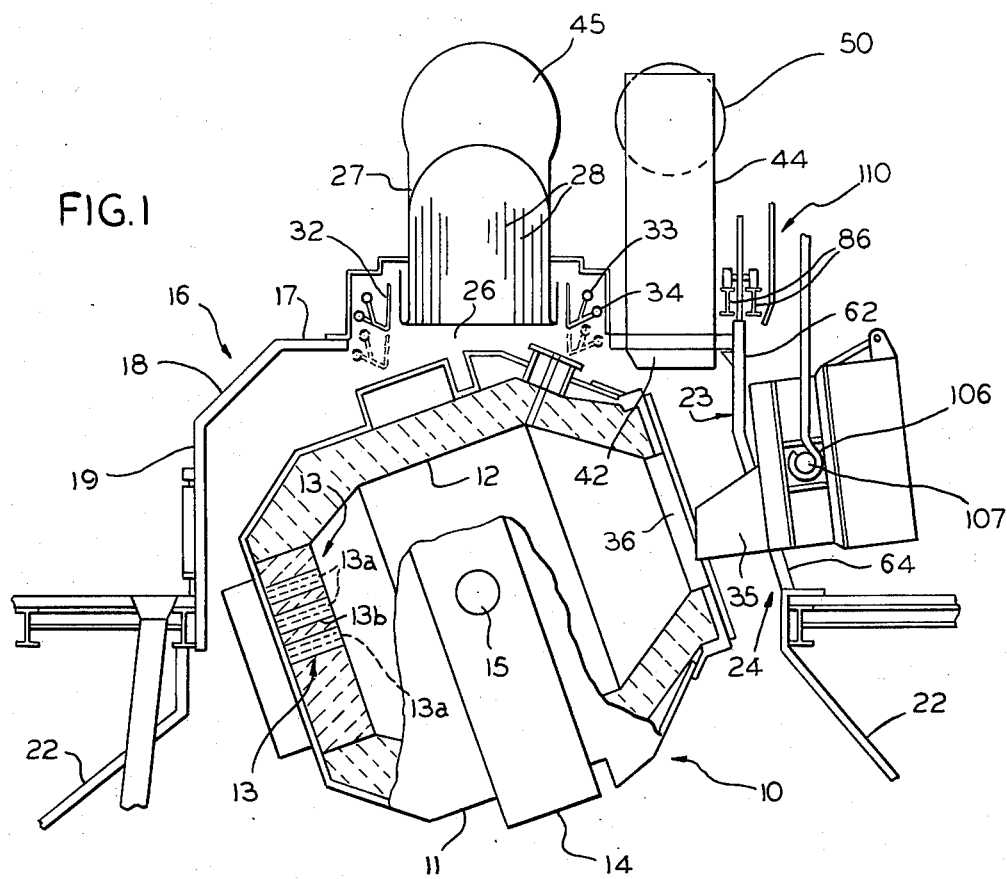
FIG. 1 is a side elevational view, partly in section, of a converter vessel enclosure incorporating the present invention.

The invention will be illustrated and described with respect to a bottom blown converter vessel 10 shown in FIG. 1 although those skilled in the art will appreciate that it has application to other types of converter vessels as well, such as basic oxygen and argon-oxygen systems.

The vessel 10 is shown in FIG. 1 to be open at its upper end and includes a metallic shell 11 and a refractory lining 12. A plurality of tuyeres 13 extend through the lower end of the vessel 10 and each includes an inner tuyere pipe 13a and an outer tuyere pipe 13b to permit the injection of oxygen and a hydrocarbon shielding fluid. As those skilled in the art will appreciate, the hydrocarbon shielding fluid which is injected in a surrounding relation to the oxygen delivered through the inner tuyere pipe 13a, prolongs the life of the tuyeres 13 and the surrounding portion of the refractory lining 12.

Converter vessels 10 of the type illustrated are generally supported in a conventional manner on a trunnion ring 14 which has a trunnion pin 15 extending from each of its opposite sides. The trunnion pins 15 are suitably supported in a well known manner on conventional bearing structures (not shown) and are coupled to a suitable drive mechanism (not shown) for tilting the vessel between various positions as may be required during a process cycle.

Figure 2:
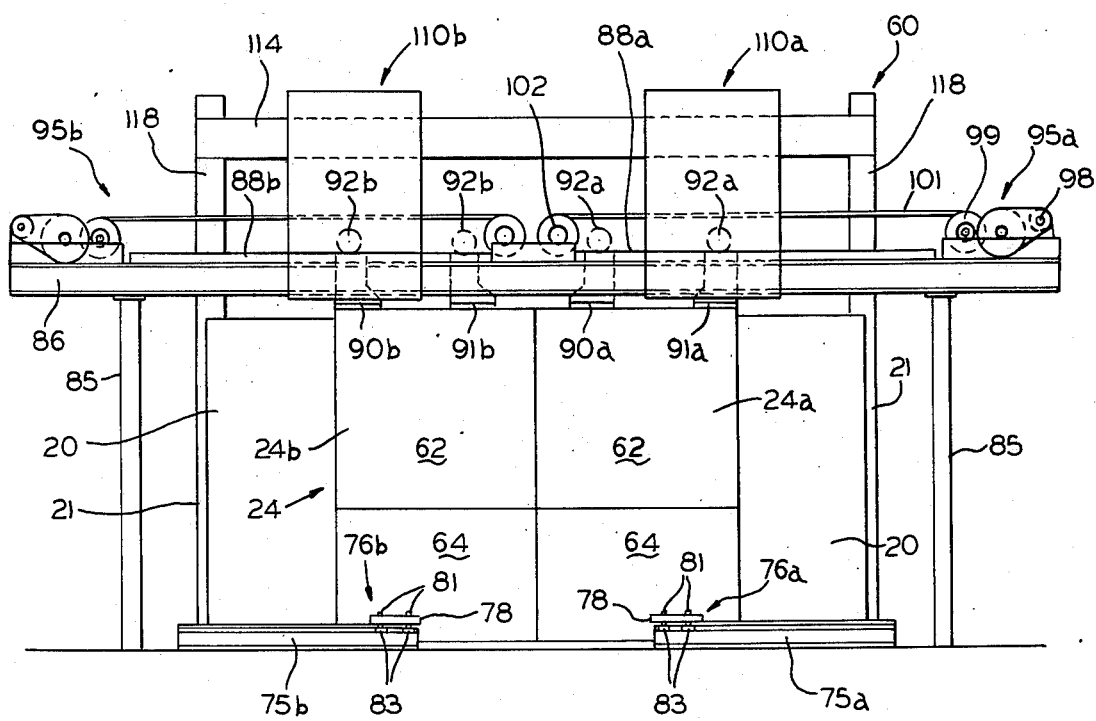
FIG. 2 is a front elevational view of a portion of the apparatus illustrated in FIG. 1.
Figure 3:
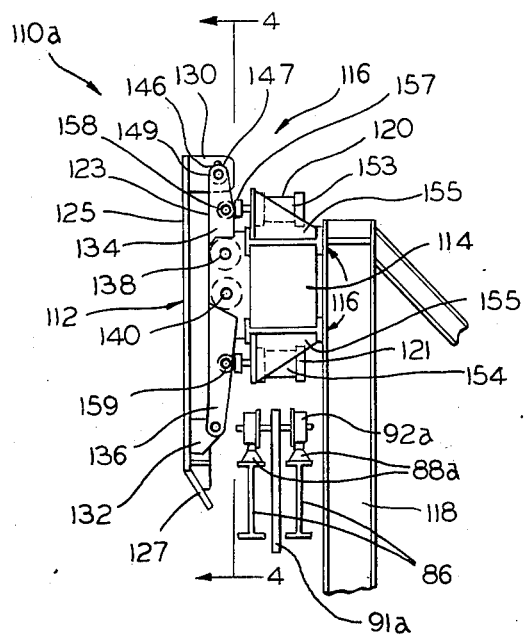
FIG. 3 is a side elevational view of the bumper assembly according to the present invention.
Figure 4:
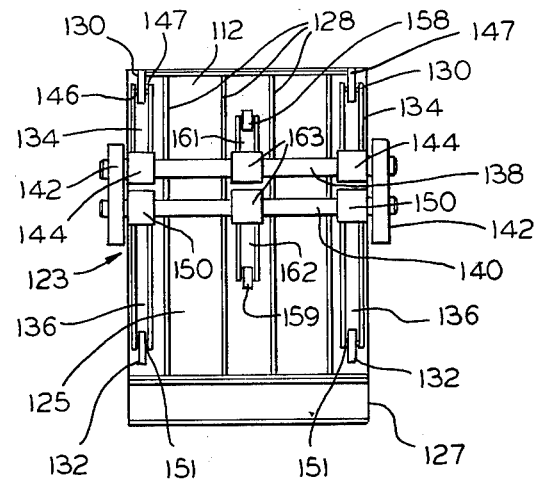
FIG. 4 is a view taken along lines 4—4 of FIG. 3.
Figure 5:
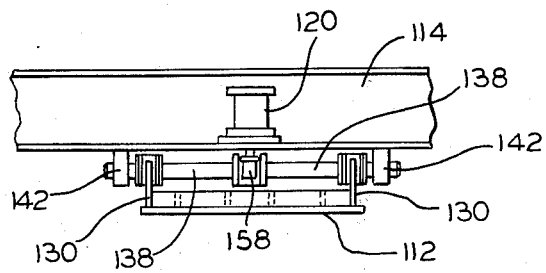
FIG. 5 is a top view of the assembly shown in FIG. 3.
Figure 6:
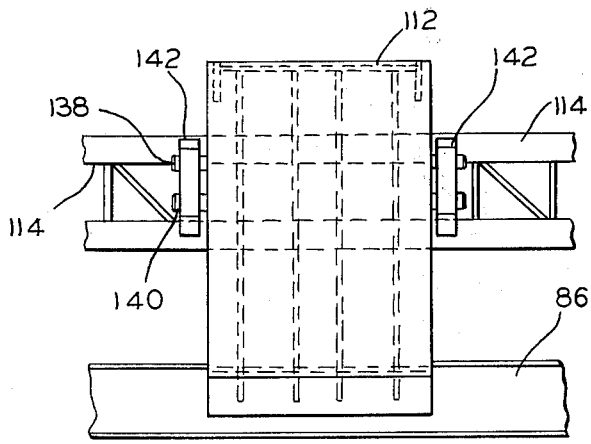
FIG. 6 is a front view of the assembly illustrated in FIG. 3.

The vessel 10 is shown in FIG. 1 to be disposed within a metallic enclosure 16 having a top wall 17 disposed above the upper end of the vessel and an inclined back wall portion 18 extending downwardly and outwardly from the top wall 17 and to the upper end of a vertical back wall portion 19. In addition, as seen in FIG. 2, the enclosure 16 includes a front wall 20 and a generally vertical end wall 21. Skirt portions 22 extend downwardly and outwardly from the lower ends of the back and front walls 19 and 20. A generally rectangular opening 23 is formed in front wall 20 and to one side of and generally parallel to the tilt axis of the trunnion pins 15. A closure door assembly 24 is mounted for movement into and out of a closed position relative to the opening 23.

A top opening 26 is formed in cover 17 for receiving a smoke hood 27 which is preferably water cooled and may be formed of a plurality of individual, longitudinally extending pipes 28 each connected at one end to a manifold pipe (not shown). A movable skirt 32 is disposed in surrounding relation to the lower end of smoke hood 27 and is also formed of a plurality of pipes whose ends are connected to cooling fluid inlet and outlet manifolds 33 and 34. As those skilled in the art will appreciate, the skirt 32 is movable vertically by means (not shown) and between positions shown by full and broken lines in FIG. 1. When the vessel 10 is in its pivoted position shown in FIG. 1 so that it may receive molten metal from the ladle 35, the skirt 32 is in its elevated position shown by full lines in FIG. 1. After vessel 10 has been returned to a generally vertical position with its open mouth 36 in alignment with hood 27, the skirt 32 is lowered to its position shown by broken lines wherein it is in proximity with the vessel mouth 36.

The main oxygen blow may then commence and off-gases flow upwardly into hood 27.

A second opening 42 is formed in cover 17 at a point generally above the access opening 23 for receiving the lower end of an auxiliary smoke hood 44. As those skilled in the art will appreciate, the primary smoke hood 27 is coupled by a conduit 45 to a gas cleaning system (not shown) which may, for example, include a quencher (not shown) and a gas scrubber (not shown). The quencher and gas scrubber may be of the variable throat venturi type of wet scrubbers which are well known in the art and which function to remove particulates and lower the temperature of off-gases discharging from vessel 10. In addition, suction means such as a fan (not shown) are provided for creating a suction under the hood 27 and within the enclosure 16. The auxiliary smoke hood 44 is connected by a second conduit 50 and a valve (not shown) to the gas cleaning system between the quencher and scrubber. For a more complete description of the gas cleaning apparatus which may be connected to the smoke hood 27, reference is made to copending application Ser. No. 340,302, filed Mar. 12, 1973 and assigned to the assignee of the present invention.

The door assembly 24 may comprise two doors 24a and 24b which are mounted for generally horizontal movement toward and away from each other on a support assembly 60. Each of the doors 24a and 24b includes an upper, generally rectangular, vertically extending portion 62 and a second generally rectangular portion 64 affixed to the lower end of portion 62 and extending obliquely outwardly therefrom to permit vessel 10 to rotated.

The door support assembly 60 includes a first pair of rails 75a and 75b disposed in general alignment and extending respectively from a point adjacent the lower outside corners of doors 24a and 24b outwardly and away from said doors and in general parllelism therewith. Roller assemblies 76a and 76b are mounted respectively at each of the lower outside corners of doors 24a and 24b for cooperative engagement with rails 75a and 75b. Each roller assembly includes a bracket 78 affixed to its associated door panel 64 and each bracket includes suitable bearings for receiving vertically extending shafts 81 which carry rollers 83 at their lower ends.

Support frame 60 includes a pair of vertical columns 85 which are disposed in the opposite sides and spaced from door assembly 24, and a pair of horizontal beam members 86 bridging the upper ends of columns 85. Two pairs of generally parallel rails 88a and 88b are mounted on members 86 with one pair being disposed above and in general parallelism with the upper edges of each door 24a and 24b. In addition, a pair of bracket members 90a, 91a and 90b, 91b are affixed to the upper edges of doors 24a and 24b, respectively, in spaced apart relation to each other and extend generally upwardly from their respective doors. A pair of rollers 92a is affixed to the upper ends of each of the brackets 90a and 91a and rollers 92b are similarly affixed to each bracket 91a and 91b, and each of the rollers engage their associated rails 88a or 88b.

The doors 24a and 24b may be moved laterally away from each other and toward an open position by drive assemblies 95a and 95b which may be identical and accordingly, only assembly 95a will be discussed in detail for the sake of brevity. While any suitable type of drive may be employed, in the illustrated embodiment, drive assembly 95a includes a drive motor 98 mounted adjacent the upper outside end of cross beams 86. The motor 98 is coupled by any suitable gear or chain and sprocket drive to a drum 99 around which a cable 101 is wound. A second drum 102 is rotatably mounted on suitable bearings for rotation about an axis parallel to the axis of drum 99 and displaced therefrom at a point generally above the inner edge of door 24a. The cable 101 is also wound about drum 102 and the opposite ends thereof are each affixed to a different one of the brackets 90a and 91a. Those skilled in the art will appreciate that operation of motor 98 to rotate drum 99 counterclockwise will move door 24a toward the right in FIG. 2 and to its open position while rotation of drum 99 in the opposite direction will move door 24a toward the left as viewed in FIG. 2 and into its closed position.

Referring to FIG. 1, it can be seen that when the vessel 10 is charged with hot metal from the ladle 35, the ladle is first moved to a position adjacent the opening 23 by means of hook 106 suspended from an overhead crane (not shown) and which engages trunnions 107 on the ladle 105. The ladle is then tipped to its position shown by full lines in FIG. 1 wherein hot metal is discharged into the vessel 10. It can be seen that as the ladle 35 of hot metal is moved toward the opening 23 and as it is tilted, the door support means 86 are adjacent the path of the upwardly extending hooks 106. Because a ladle full of hot metal has a relatively large mass and the inertia thereof, if the beams 86 are struck by the hooks 106 as the ladle moves toward opening 23, severe damage can result with the possible consequent jamming of the door assembly. The beams are, therefore, protected by bumper assemblies 110 which are located at positions most vulnerable to engagement by the ladle 35. In the preferred embodiment of the invention, a pair of such bumper assemblies 110a and 110b are shown to be mounted adjacent the front beams 86 with one being disposed adjacent each of the opposite sides of the opening 23.

The bumper assemblies 110a and 110b are identical and accordingly, only assembly 110a will be described in detail for the sake of brevity. Bumper assembly 110a is shown in FIGS. 3-6 to include a bumper plate or shield 112 resiliently mounted on a cross beam assembly 114 by means of a shock absorber assembly 116. The cross beam assembly 114 is supported at each of its opposite ends by vertical support posts 118 which are located behind beams 86.

The shock absorber assembly 116 includes a pair of shock absorbers 120 and 121 mounted on the upper and lower surfaces of cross beam assembly 114 and a linkage 123 which mounts plate 112 on beam assembly 114 and engages shock absorbers 120 and 121. Plate 112 includes a generally planer portion 125 and a fender portion 127 affixed adjacent the lower end of portion 125 and extending obliquely inwardly therefrom with its lower end located below the midpoints of beams 86. A plurality of brace members 128 are affixed to the rear surface of plate 112 as are upper and lower brackets 130 and 132, respectively, which are generally spaced apart and located at the corners of planer plate portion 125.

The linkage assembly 123 includes a pair of upper arms 134 and a pair of lower arms 136 which are each composed of a pair of parallel link members. The arms 134 and 136 are coupled to beam 114 through a pair of parallel shafts 138 and 140 which are journaled for rotation in a generally horizontal relation on beam assembly 114 by bearing supports 142 and which respectively receive the ends of said shafts. The arms 134 are affixed at their lower ends to shaft 138 by hub members 144 and the upper ends of the link members forming arms 134 are bridged by a pin 146 which carries a cam follower 147 received in a slot 149 formed in bracket 130. The arms 136 are similarly affixed at their upper ends to shaft 140 by hub members 150 and their lower ends are pivotally coupled to brackets 132 by pins 151.

Shock absorbers 120 and 121 respectively include cylinders 153 and 154 mounted above and below beam assembly 114 by brackets 155. Plungers 157 and 159 respectively extend from cylinder 153 and 154 and each engages one of a pair of rollers 158 and 159 which are respectively carried by arms 161 and 162. The other end of arms 161 and 162 are affixed to shafts 138 and 140 respectively by members 163 and extend upwardly and downwardly therefrom.

It will be appreciated that when the bumper plate assembly 112 is impacted by a cables or other structure supporting hook 106 which supports a ladle of molten metal, the pivotal mounting of the shafts 138 and 140 and the pivotal connection between plate 112 and the arms 134 and 136 will cause the plate to be displaced rearwardly and in a generally parallel direction from its rest position with the impact energy being absorbed by the shock absorbers 153 and 154. This will occur regardless of the point at which the plate assembly 112 is impacted. After the impact, the return springs (not shown) within the shock absorbers 153 and 154 will return the bumper plate assembly 112 to its initial position. In this manner, the impacts of the ladle of the molten metal will be absorbed without damaging the door support assembly.

Figure 7:
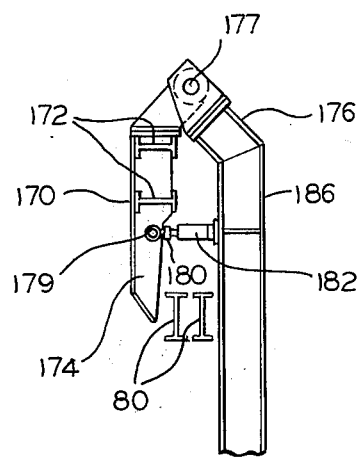
FIG. 7 illustrates an alternate embodiment of the invention.

FIG. 7 shows an alternate embodiment of the invention wherein each bumper plate 170 is affixed to a pair of generally parallel and horizontal beam members 172, the ends of which are affixed to a pair of arms 174, only one of which can be seen in FIG. 7. One of arms 174 is located adjacent each vertical post 186 and each post has a forwardly angled extension 176 at its upper end and between which a shaft 177 is journaled for rotation. Each arm 174 is affixed at its upper end to shaft 177 and carries a roller 179 intermediate its ends for engagement by the plunger 181 of a shock absorber 182 mounted generally horizontally on post 86 and between said post and arm 174.

It will be appreciated that a pair of bumper plates 170 may be mounted on beams 172 and at the same approximate locations relative to the axis doors as in the assembly of FIG. 2. When either of the bumper plates 170 is impacted by a ladle hook, the entire assembly consisting of plates 170, beams 172 and arms 174 pivot with shaft 177 and against the shock absorbers 182. The impact energy is absorbed by shock absorbers 182 which restore plates 170 and arms 174 to their initial unpivoted position.

While only two embodiments of the invention have been illustrated and described, it is not intended to be limited thereby but only by the scope of the appended claims.

I claim:

1. A stationary enclosure for a pivotally mounted metallurgical vessel, said enclosure including: a side wall and an access opening formed in said enclosure whereby said vessel may be charged with metal from metal conveying means movable in a first direction toward said enclosure, door means movably mounted relative to said opening for selectively closing the same, support means, arm means pivotally mounted on said support means for movement in said first direction, bumper means mounted adjacent said door means, said bumper means including shield means mounted on said arm means and having plate means provided with a first surface facing in a direction opposite to said first direction, said shield means having an initial position and being mounted for limited movement in said first direction as said arm means pivots, and shock absorber means disposed adjacent said shield means and being positioned, constructed and arranged for resisting pivotal movement of said arm means in said first direction as a result of engagement of said plate means by said conveyer means, said shock absorber means being operative for absorbing impact energy resulting from the engagement of said conveying means with said shield means and for yielding to permit movement of said shield means in said first direction and for restoring said shield means to an initial position.

2. The invention set forth in claim 1 wherein said arm means includes a first arm pivotally mounted on said support means and engaging said plate means and a second arm means pivotal with said first arm means and engaging said shock absorber means.

3. The invention set forth in claim 2 and including shaft means rotatably mounted on said support means, said first and second arms being fixed to said shaft means and pivotal therewith.

4. The invention set forth in claim 1 and including first and second shaft means rotatably mounted on said support means, said arm means including a first pair of arms affixed to a first one of said shaft means and extending upwardly therefrom, the opposite ends of said arm means being pivotally connected to said shield means, a second pair of arm means affixed to the second one of said shaft means and extending downwardly therefrom with the opposite ends thereof being pivotally connected to said shield means.

5. The invention set forth in claim 4 wherein said arm means also includes a fifth arm affixed to the first one of said shaft means and extending upwardly therefrom and a sixth arm affixed to the second one of said shaft means and extending downwardly therefrom, said shock absorber means including a first shock absorber mounted on said support means and being engageable by said fifth arm and a second shock absorber mounted on said support means and engagable by said sixth arm.

6. The invention as set forth in claim 5 wherein one of said first and second pair of arm means is coupled to said shield means by pivotal sliding connection.

7. The invention set forth in claim 1 and including shaft means rotatably mounted on said support means, said arm means being affixed to said shaft means.

8. A stationary enclosure for a pivotally mounted metallurgical vessel having a charging mouth, said enclosure including a top disposed above said vessel and side wall means extending downwardly adjacent said vessel, an access opening formed in said side wall means whereby said vessel may be tilted to position said mouth adjacent said access opening for being charged with metal from metal conveying means movable in a first direction toward said enclosure, door means movably mounted relative to said opening for selectively closing the same, and bumper means mounted adjacent said door means, said bumper means including shield means having a first side facing in a direction opposite to said first direction, support means, said shield means having an initial position and being mounted on said support means for limited pivotal movement in said first direction upon being impacted by the conveyor means, and shock absorber means mounted adjacent said shield means and constructed and arranged for resisting movement of said shield means in said first direction, said shock absorber means being operative for absorbing impact energy resulting from the engagement of said conveying means with said shield means and for yielding to permit movement of said shield means in said first direction and for restoring said shield means to its initial position.

9. The invention set forth in claim 8 and including door supporting means for supporting said door means, said door supporting means being independent of said support means, said shield means being positioned on said support means between said door supporting means and said conveying means.

10. The invention as set forth in claim 9 wherein said shield means includes a pair of shield members movably mounted on said support means in a horizontally spaced apart relation.

11. An enclosure for a pivotally mounted metallurgical vessel having a charging mouth, said enclosure including a top disposed above said vessel and side wall means extending downwardly adjacent said vessel, an access opening formed in the side wall means of said enclosure whereby said vessel may be tilted to position said mouth adjacent said access opening for charging with metal from metal conveying means movable in a first direction toward said enclosure, door support means mounted adjacent said opening, door means mounted on said door support means for movement relative to said opening for selectively closing the same, and bumper means mounted on the opposite side of said door support means relative to said enclosure, said bumper means including shield means having a first side facing in a direction opposite to said first direction, said shield means having an initial position and being mounted on said support means for limited pivotal movement in said first direction, and resilient means mounted adjacent the opposite side of said shield means and constructed and arranged for resisting movement of said shield means in said first direction, said resilient means being operative for absorbing impact energy resulting from the engagement of said conveying means with said shield means and for yielding to permit movement of said shield means in said first direction and for restoring said shield means to an initial position.

* * * * *